E. H. BELDEN.
WHEEL CARRIER.
APPLICATION FILED JULY 30, 1919.
1,404,002.
Patented Jan. 17, 1922.
3 SHEETS—SHEET 1.
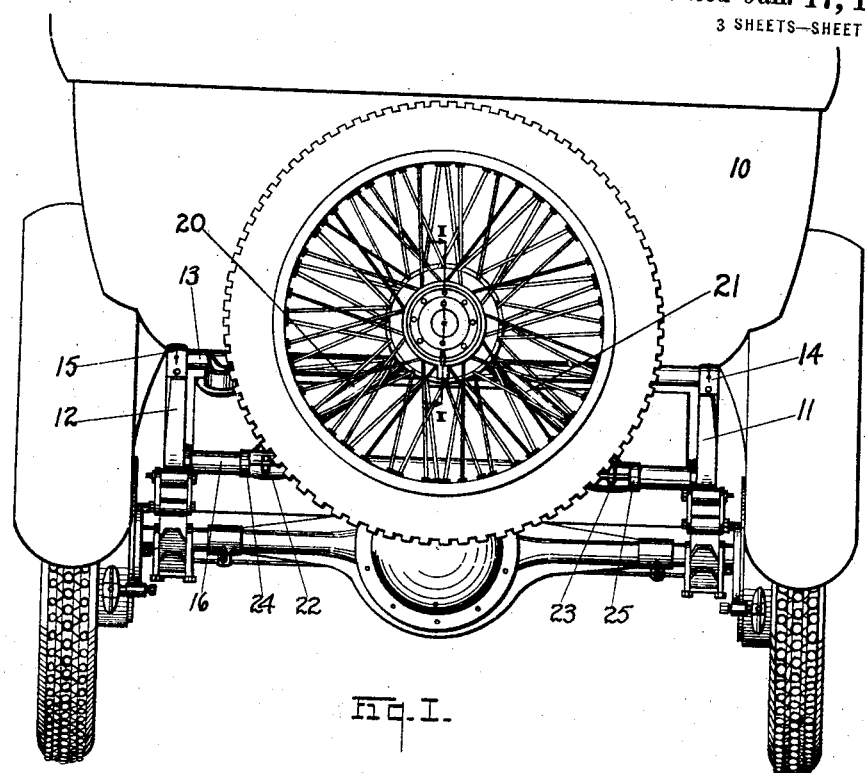
Fig. I.
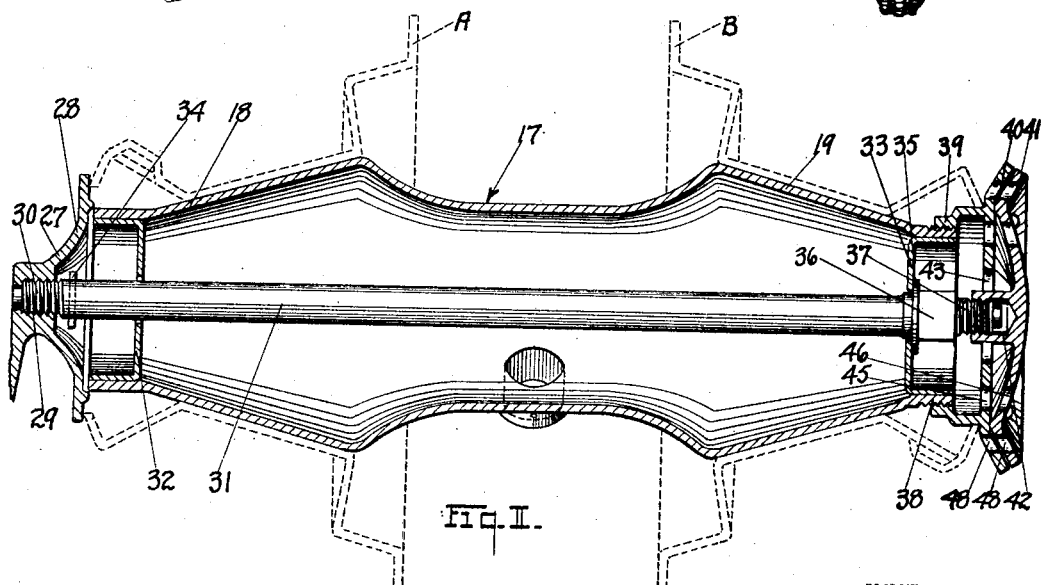
Fig. II.
INVENTOR.
Edward H. Belden
BY Chester H. Braselton
ATTORNEY

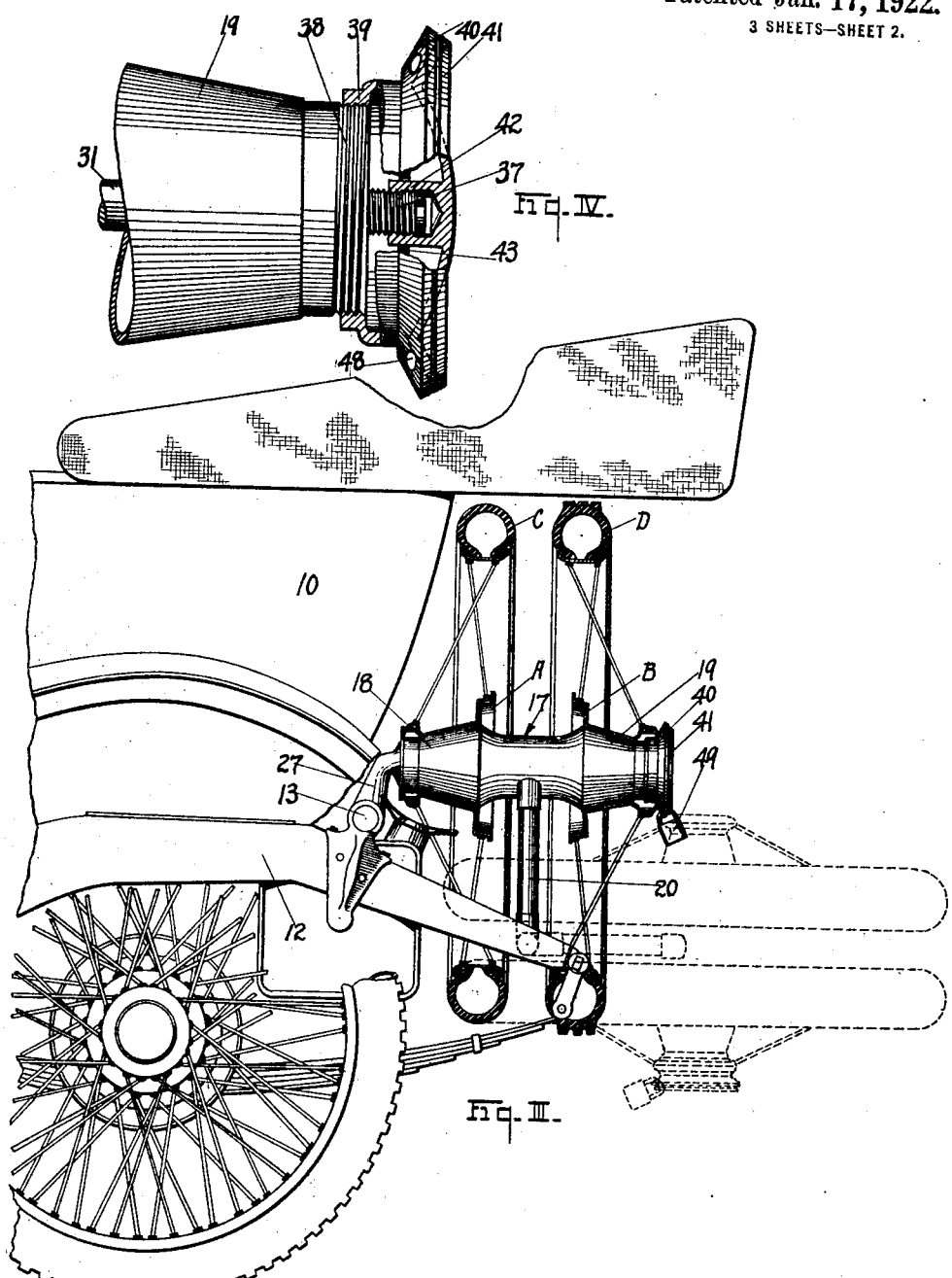

E. H. BELDEN.
WHEEL CARRIER.
APPLICATION FILED JULY 30, 1919.
1,404,002.
Patented Jan. 17, 1922.
3 SHEETS—SHEET 3.
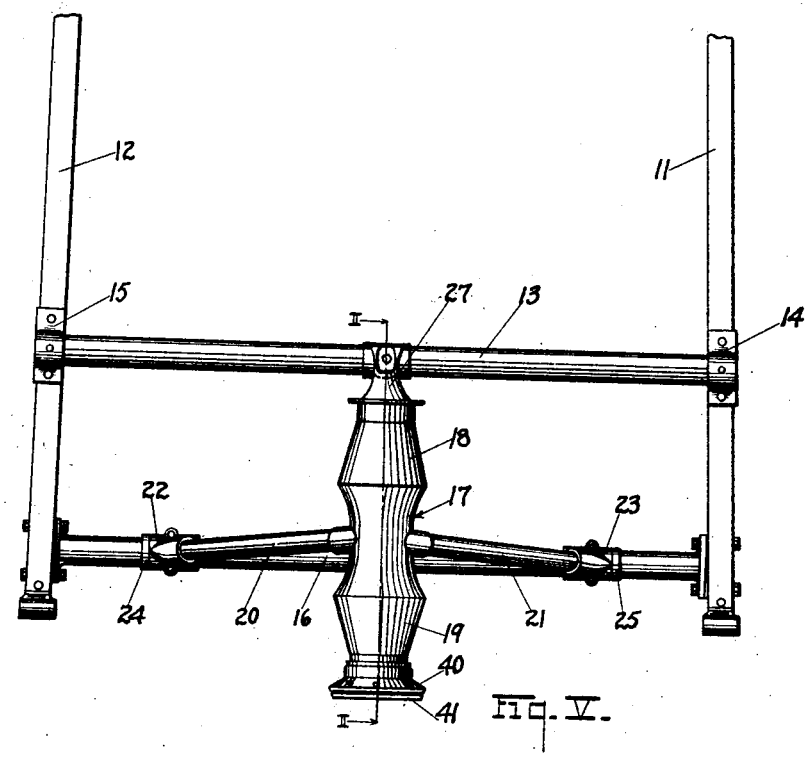
Fig. V.
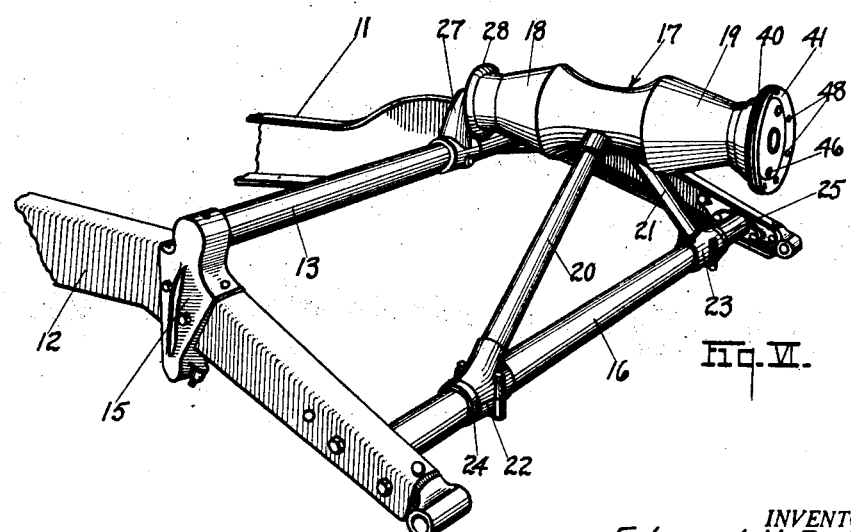
Fig. VI.
INVENTOR.
Edward H. Belden
BY Chester W. Braselton
ATTORNEY

UNITED STATES PATENT OFFICE.

EDWARD H. BELDEN, OF TOLEDO, OHIO.

WHEEL CARRIER.

1,404,002.  Specification of Letters Patent.  Patented Jan. 17, 1922.

Application filed July 30, 1919. Serial No. 314,341.

*To all whom it may concern:*

Be it known that I, EDWARD H. BELDEN, residing at Toledo, county of Lucas, State of Ohio, have invented certain new and useful Improvements in Wheel Carriers, of which I declare the following to be a full, clear, and exact description.

This invention relates to improvements in wheel carriers, and particularly to carriers of the type wherein the carrier is pivotally secured to the frame of an automobile.

One object of the invention is to provide a simple and efficient form of securing means for the purpose of firmly securing the wheels upon the carrier to prevent their removal therefrom by any unauthorized person.

A further object of the invention is to provide a device of this character which is of simple construction and efficient in operation.

Further objects of the invention relate to economies of manufacture and details of construction as will appear from the detailed description to follow.

A structure constituting one embodiment of the invention is illustrated in the accompanying drawings forming a part hereof in which:

Figure I is a rear elevational view of an automobile showing the position of the wheel carrier attached thereto.

Figure II is a detailed sectional view, taken along the line II—II of Figure I.

Figure III is a side elevational view of the rear portion of an automobile illustrating the position of the wheel carrier when in its normal upright position in full lines, and showing in dotted lines the carrier in the act of being swung into inclined position in contact with the ground.

Figure IV is a detail view, partially in section, illustrating the means employed for securing the carrier in upright position and the wheels against removal thereon.

Figure V is a top plan view of the carrier structure illustrating the same in upright position with the wheels removed.

Figure VI is a perspective view of the carrier structure illustrated in Figure V.

In the embodiment of the invention illustrated herewith, 10 indicates the body portion of an automobile which is supported by a pair of longitudinally extending side frame members 11 and 12, the said frame members being connected by means of a transverse brace member 13 mounted in brackets 14 and 15 which are secured to the frame members 11 and 12 respectively. A transverse connecting rod 16 connects the rear end portions of the frame members 11 and 12, and serves as a pivot around which the carrier is pivotally mounted.

The carrier comprises a tubular member 17 provided with oppositely extending tapered end portions 18 and 19 which are adapted to receive the hubs A and B of a pair of wheels C and D. A pair of downwardly extending divergent arms 20 and 21 are firmly secured to the intermediate portion of the tubular member 17, and the lower end portions of these arms are firmly secured to split sleeves 22 and 23 respectively which are rotatably mounted upon the cross rod 16 and retained against longitudinal movement relative thereto by means of suitable collars 24 and 25 firmly secured to the rod. It will be readily understood from an inspection of the drawings that the carrier 17 is mounted so as to pivot about the rod 16 as a center, and is so arranged as to be capable of being maintained normally in substantially upright position as shown in full lines in Figure III, or it may be swung about the rod 16 as a center so as to occupy an inclined position in contact with the ground, the carrier being shown partially rotated into its inclined position in dotted lines in Figure III. When the structure is retained in normally upright position it will be apparent that upon release of the fastening devices which retain the outer wheel D in position upon the carrier the wheel D may be removed or replaced thereon as conditions may require. When, however, the carrier is rotated into an inclined position, the wheel C may be readily removed from the carrier or replaced thereon as may be desired. Thus it will be seen that by reason of the pivotal mounting of the carrier means is provided for readily securing two spare wheels in position upon the automobile frame whereby either of these wheels may be removed or replaced without interference with the other wheel. One of the wheels being removed from and positioned upon the carrier when the carrier is in its normal upright position makes it unnecessary to rotate the carrier about its pivot point when it is desired to remove this wheel, while the opposite wheel being removable from and replaceable upon the carrier when the same is in an inclined position, makes it only necessary to remove the fastening means for securing the carrier in its upright position and to rotate the same into a position in contact with the ground in order to remove or replace the wheel carried upon the opposite side of the carrier.

An upwardly extending arm 27 is firmly secured to the cross bar 13 at a point substantially centrally thereof, and the arm 27 is provided at the upper end portion thereof with a substantially circular boss 28, the inner face of which is engaged by the inner end portion of the tubular member 17 when the carrier is in its normally upright position. The boss 28 is provided with a threaded opening 29 positioned substantially centrally thereof, and adapted to receive the threaded end portion 30 of a rod 31 which serves to releasably retain the wheel carrier normally in upright position relative to the frame. The rod 31 is rotatably mounted in aligned openings formed in a pair of sleeves 32 and 33 which sleeves are suitably secured within the tubular member 17 adjacent the opposite end portions thereof. A pin 34 is fixedly positioned in the inner end of the rod 31 and serves to prevent removal of the rod from the tubular member by reason of the pin striking against the sleeve 32. The rod 31 is provided near the outer end portion thereof with a collar 35 which bears against the outer edge of the sleeve 33 to retain the tubular member securely in position relative to the arm 27 when the rod 31 is threaded within the opening formed in the boss 28. The rod 31 is provided with an angular portion 36 adjacent the collar 35 to which a wrench may be applied for threading the inner end portion of the rod into the threaded opening formed in the boss 28. The outer end portion of the rod 31 is threaded as indicated at 37, this portion of the rod being provided with a right handed thread for a purpose which will be more fully described hereinafter.

The outer end portion of the tubular member 17 is provided with a threaded portion 38 which is formed with a left handed thread for the reception of the inwardly extending interiorly threaded portion 39 of an inner cap 40. An outer cap 41 is provided with a portion adapted to bear against the outer surface of the inner cap 40 and has an inwardly extending threaded boss 42 which is adapted to be threaded upon the threaded portion 37 of the rod 31. The inner cap 40 is provided with a central opening 43 within which the boss 42 carried by the outer cap projects when the same is threaded upon the outer end portion of the rod 31. The inner cap 40 is also provided with a pair of oppositely positioned openings 45 which are adapted to receive the prongs of a wrench for the purpose of threading the cap upon the outer end portion of the tubular member 17 or removing the same therefrom. The outer cap 41 is provided with a pair of oppositely positioned openings 46 similar to the openings 45 previously described and adapted to provide means whereby the outer cap may be threaded upon or removed from the threaded end portions of the rod 31. The caps 40 and 41 are both provided with a plurality of openings 48 positioned near their edge portions and so located as to be capable of registering with each other when the caps are rotated a sufficient degree so that their adjacent surfaces bear against each other. A lock 49 is provided for insertion in the registering openings 48 whereby relative rotation of the caps 40 and 41 may be positively prevented. The particular character of the lock to be employed is not of importance, it being essential merely that the locking means be such as to prevent any unauthorized operation, as distinguished from a mere latch or fastening such as might be released by unauthorized persons. The terms "lock" and "locking means" are used in this sense hereinafter.

The operation of the mechanism shown and described herewith is such as to provide suitable means for carrying two spare wheels upon the wheel carrier and to enable either of said wheels to be removed therefrom or replaced thereon whenever it may be desired, and also provide locking means for securing the wheel carrier in upright position relative to the automobile frame as well as to provide mechanism for retaining the wheels in position upon the carrier, these holding means being capable of being locked in position to prevent removal of either of the wheels and to prevent the carrier from being swung about its pivot as a center whereby the wheels may be removed by any unauthorized person. When the various parts are in assembled position, the threaded end portion of the rod 31 is threaded within the opening 29 formed in the boss 28, and the collar 35 carried by the rod bears against the sleeve 33 to retain the tubular member in position relative to the boss 28. The caps 40 and 41 may be threaded upon the parts by which they are held when rotated in opposite directions, and consequently when the adjacent edges of these caps bear against each other, the removal of either of the caps is prevented by locking the same together to prevent independent rotative movement of either of the caps relative to the other. Upon the removal of the locking means the caps may be removed by being rotated in opposite directions, and after the removal of the caps the wheel D may be removed from the tubular member or the rod 31 may be rotated to disengage the tubular member from the boss 28 after which the wheel C may be removed. In the assembling of the parts the wheels C and D are positioned upon the tubular member whereupon the tubular member is rotated upon the rod 16 as a center until the end portion thereof engages with the boss 28 when the end portion 30 of the rod 31 may be threaded within the openings formed in the boss 28 and the caps 40 and 41 threaded upon their respective supporting members and locked in position relative to each other.

While I have shown and described in considerable detail a specific embodiment of my invention, it is to be understood that this showing and description is illustrative only and for the purpose of rendering my invention more clear, and that I do not regard the invention as limited to the precise details of construction illustrated or described except in so far as I have included such limitations within the terms of the following claims, in which it is my intention to claim all novelty inherent in my invention broadly as well as specifically.

What I claim as new and desire to secure by Letters Patent is:

1. In combination with an automobile frame, a hub receiving member provided with a threaded portion adjacent one end thereof, a member for releasably connecting said hub receiving member to a fixed portion of the frame, a cap threaded upon the end of the hub receiving member, a second cap threaded upon the connecting member, said caps being rotatable in opposite directions for threading them upon the corresponding members, and a lock for preventing rotation of the caps in opposite directions.

2. In combination with an automobile frame, a hub receiving member provided with a threaded portion adjacent one end thereof, a member for releasably connecting said hub receiving member to a fixed portion of the frame, a cap threaded upon the end of the hub receiving member, a second cap threaded upon the connecting member, said caps being rotatable in opposite directions for threading them upon the corresponding members, and being adapted to overlie and impinge upon each other in their final operative positions and means to prevent relative rotation of said caps.

3. In combination with an automobile frame, a swingingly mounted hub receiving member carried by the frame and provided with a threaded portion adjacent one end thereof, a member for releasably connecting said hub receiving member to a fixed portion of the frame, a cap threaded upon the end of the hub receiving member, a second cap threaded upon the connecting member, and a single locking means for holding the caps against rotation when threaded upon said members.

4. In combination with an automobile frame, a swingingly mounted hub receiving member provided with a threaded portion adjacent one end thereof, a member entirely enclosed by said hub receiving member for releasably connecting said hub receiving member to a fixed portion of the frame, a cap threaded upon the end of the hub receiving member, a second cap threaded upon the connecting member, said caps being rotatable in opposite directions for threading them upon the corresponding members and a single locking means for said two caps.

5. In automobile tire carrier structures, a tubular support, a tire carrier mounted thereon, a rod within said tubular support removably attached at its inner end to the automobile frame, the outer ends of said support and rod being threaded, interfitting nuts upon said support and rod respectively said nuts having superimposed flanges, and locking means for holding said flanges in any one of a plurality of positions of relative adjustment.

6. In automobile tire carrier structures, a tubular support, a tire carrier mounted thereon, a rod within said tubular support removably attached at one end of the automobile frame, the outer ends of said support and rod being threaded, interfitting nuts upon said support and rod respectively, said nuts having superimposed flanges, one of which is provided with a series of circularly arranged holes and locking means mounted in the other flange adapted to engage any of said holes for locking the two flanges against relative movement.

7. In automobile tire carrier structures, a tubular support, a tire carrier mounted thereon, a rod within said tubular support removably attached at one end to the automobile frame, the outer ends of said support and rod being reversely threaded, interfitting nuts upon said support and rod respectively, said nuts having superimposed flanges, and locking means for holding said flanges in any one of a plurality of positions of relative adjustment.

In testimony whereof, I affix my signature.

EDWARD H. BELDEN.

Certificate of Correction.

It is hereby certified that Letters Patent No. 1,404,002, granted January 17, 1922, upon the application of Edward H. Belden, of Toledo, Ohio, for an improvement in "Wheel Carriers," were erroneously issued to the inventor, said Belden, whereas said Letters Patent should have been issued to *The Willys-Overland Company, of Toledo, Ohio, a Corporation of Ohio*, said corporation being assignee of the entire interest in said invention, as shown by the records of assignments in this office; and that the said Letters Patent should be read with this correction therein that the same may conform to the record of the case in the Patent Office.

Signed and sealed this 24th day of April, A. D., 1922.

[SEAL.]

KARL FENNING,
*Acting Commissioner of Patents.*